(12) United States Patent
Benc et al.

(10) Patent No.: US 8,850,069 B2
(45) Date of Patent: Sep. 30, 2014

(54) SYSTEMS AND METHODS FOR DYNAMICALLY ADAPTIVE MULTI-WAY MESSAGE CONVERSION

(75) Inventors: Ivan Benc, Zagreb (HR); Ivan Skuliber, Zagreb (HR); Tomislav Stefanec, Zagreb (HR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 358 days.

(21) Appl. No.: 12/103,801

(22) Filed: Apr. 16, 2008

(65) Prior Publication Data

US 2009/0265434 A1     Oct. 22, 2009

(51) Int. Cl.
*G06F 15/16*     (2006.01)
*G06F 9/54*     (2006.01)
*H04L 29/06*     (2006.01)

(52) U.S. Cl.
CPC .............. *G06F 9/546* (2013.01); *G06F 9/541* (2013.01); *H04L 69/08* (2013.01)
USPC ............................ 709/246; 709/245; 709/228

(58) Field of Classification Search
CPC .......... H04L 51/12; H04L 51/14; H04L 51/18
See application file for complete search history.

(56) References Cited

U.S. PATENT DOCUMENTS

| | | |
|---|---|---|
| 2004/0068574 A1 | 4/2004 | Costa Requena et al. |
| 2005/0091362 A1* | 4/2005 | Shigeta et al. ................ 709/223 |
| 2005/0213724 A1 | 9/2005 | O'Brien et al. |
| 2005/0226225 A1 | 10/2005 | Shigeta |
| 2009/0125595 A1* | 5/2009 | Maes ........................... 709/206 |

FOREIGN PATENT DOCUMENTS

| | | |
|---|---|---|
| GB | 2442280 A | 4/2008 |
| JP | 2005301468 A | 10/2005 |
| JP | 2006-277046 A | 10/2006 |
| WO | 2006/071468 A2 | 7/2006 |
| WO | 2007/071269 A1 | 6/2007 |
| WO | 2007071269 A1 | 6/2007 |

OTHER PUBLICATIONS

ISR & WO in corresponding International Application No. PCT/SE2009/050229, issued on Jul. 15, 2009.
Rosenberg, J., et al., "SIP: Session Initiation Protocol," IETF RFC 3261, Jun. 2002; www.rfc-editor.org/rfc/rfc3261.txt, retrieved on Apr. 17, 2008, pp. 1-343.
Chinnici, R., et al., "Web Services Description Language (WSDL) Version 2.0 Part 1: Core Language," W3C Recommendation, Jun. 26, 2007, www.w3.org/TR/wsdl20, retrieved Apr. 17, 2008, pp. 1-73.
Gudgin, M., et al., "SOAP Version 1.2 Part 1: Messaging Framework (Second Edition)," W3C Recommendation Apr. 27, 2007, www.w3.org/TR/soap12-part1, retrieved Apr. 17, 2008, pp. 1-49.

(Continued)

*Primary Examiner* — Thu Nguyen
*Assistant Examiner* — Nam Tran
(74) *Attorney, Agent, or Firm* — Patent Portfolio Builders PLLC

(57) ABSTRACT

Multilateral, dynamic and coordinated message conversion between different messages composed using different protocols, e.g., Session Initiation Protocol (SIP) and Simple Object Access Protocol (SOAP) are described. For each message pattern or set of messages between coordinated peers, a conversion session is established. Incoming messages are correlated to their respective conversion sessions so that a common set of conversion rules can be used to convert messages within a particular session.

14 Claims, 7 Drawing Sheets

(56) References Cited

OTHER PUBLICATIONS

Bray, T., et al., "Extensible Markup Language (XML) 1.0 (Fourth Edition)," W3C Recommendation Aug. 16, 2006, edited in place Sep. 29, 2006, www.w3.org/TR/REC-xml, pp. 1-33.

Fox, G., et al., "A Web Services Framework for Collaboration and Audio/Videoconferencing," The 2002 International Multiconference in Computer Science and Computer Engineering, Internet Computing (IC '02), Jun. 2002, pp. 1-6.

Avaya Products, www.avaya.com, retrieved Apr. 17, 2008.

IBM IMS SOAP Gateway, www-306.ibm.com/software/data/ims/soap, retrieved Apr. 17, 2008, pp. 1-3.

Mitra, N., et al., "SOAP Version 1.2 Part 0: Primer (Second Edition), W3C Recommendation Apr. 27, 2007," W3C, http://www.w3.org/TR/soap12-part0/, pp. 1-47.

Chinnici, R., et al., "Web Services Description Language (WSDL) Version 2.0 Part 1: Core Language, W3C Working Draft 3, Aug. 2004," W3C, http://www.w3.org/TR/2004/WD-wsdl20-20040803/, pp. 1-72.

Clement, L., et al., "UDDI Version 3.0.2 UDDI Spec Technical Committee Draft, Dated Oct. 19, 2004," OASIS, http://uddi.org/pubs/uddi_v3.htm, pp. 1-370.

Supplementary European Search Report in corresponding European Application No. EP 09732810.9—1862 dated Nov. 21, 2013.

Alberto Baravaglio, et al.; "Web Service Applicability in Telecommunication Service Platforms"; Next Generation Web Services Practices, International Conference on Next Generation Web Services Practices; XP010892543; IEEE Computer Society; Aug. 22-26, 2005; pp. 1-6; Piscataway, NJ.

* cited by examiner

| Section name | Section name |
|---|---|
| Coordinated Peers | ```<br><coordinated-peers><br>  <WS name="scientiobot"><br>    <wsdl><br>      http://10.0.0.1/service.asmx?WSDL<br>    </wsdl><br>    <location><br>      http://10.0.0.1/service.asmx<br>    </location><br>    <host><br>      10.0.0.1<br>    </host><br>  </WS><br></coordinated-peers><br>``` |
| Session | ```<br><session name="mySession"><br>  <var name="sessionID1" type="string"<br>       idn="true"<br>       location="SIP:header:call-id" /><br><br>  <var name="sessionID2" type="string"<br>       idn="true" wsName="scientiobot"<br>       wsMethod="getData" wsType="response"<br>       location="SOAP:body:sessionID" /><br><br>  <var name="data" type="string" /><br>  ...<br></session><br>``` |
| Conditions | ```<br><conditions><br>  <protocol name="SIP"><br>    <message type="MESSAGE"><br>      <condition><br>        <if><br>          <exec><br>            start<br>          </exec><br>        </if><br>      </condition><br>    </message><br>    ...<br>  </protocol><br>  ...<br></conditions><br>``` |
| Actions | ```<br><actions><br>  <action name="start" inType="SIP"<br>          first="true"><br>    <get type="string"<br>         location="header:contact"><br>      $mySession.contact$<br>    </get><br>    ...<br>    <send protocol="SIP" type="OK" /><br>    <send protocol="SOAP"<br>          name="getGUIDForUser"<br>          type="Request"<br>          service="scientiobot"><br>      <arg name="Username" type="string"><br>        "Ivo Budis"<br>      </arg><br>      <arg name="PersonalityID"<br>           type="string"><br>        "f39bbd86-30fd-45a2-a571-309f828e5"<br>      </arg><br>    </send><br>  </action><br>  ...<br></actions><br>``` |

FIG. 5

SYSTEMS AND METHODS FOR DYNAMICALLY ADAPTIVE MULTI-WAY MESSAGE CONVERSION

TECHNICAL FIELD

The present invention relates generally to communications and in particular to methods, devices and systems for converting messages in communications systems.

BACKGROUND

Communication systems continue to grow and evolve. Convergence between different types of communication systems, e.g., Internet Protocol (IP), connection-based voice communications, and the like, is advancing rapidly. Recently the phrase "Next Generation Network" (NGN) has been used to describe various activities associated with this evolution. As defined by the International Telecommunications Union (ITU), an NGN is a packet-based network able to provide services (including telecommunication services) and able to make use of multiple broadband, QoS-enabled transport technologies and in which service-related functions are independent from underlying transport-related technologies. NGNs will also likely offer unrestricted access by users to different service providers and will support generalized mobility, which in turn will provide for consistent service provision to end users.

So called "Web Services" are another feature which may become commonplace in NGNs. Web Services provide, for example, a mechanism for interoperability between software entities which reside on different infrastructures and which may be operated by different companies. Web Services are typically defined as providing distributed services using, e.g., the standards suite Web Services Description Language (WSDL), Simple Object Access Protocol (SOAP) and Universal Description, Discovery and Integration (UDDI). For the interested reader, a description of WDSL can be found online as "Web Services Description Language (WSDL) Version 2.0 Part 1: Core Language, W3C Working Draft 3, August 2004". Similarly, a description of SOAP can be found online as "SOAP Version 1.2 Part 0: Primer (Second Edition), W3C Recommendation 27 Apr. 2007". Additionally, for UDDI, a standards document entitled "UDDI Version 3.0.2 UDDI Spec Technical Committee Draft, Dated 20041019" can be found online.

Web Services can be characterized as software systems which are designed to support interoperable Machine-to-Machine (M2M) interaction over networks and are most commonly used for Remote Procedure Call (RPC) and as a building block in Service Oriented Architecture (SOA) systems. The web service approach uses WSDL to describe SOAP messaging (which in turn is a protocol used for exchanging XML messages over networks), typically using HTTP as a transport protocol. However, more recently it has been suggested to use Session Initiation Protocol (SIP) as a transport protocol for SOAP messages. SIP is a protocol used predominantly in the telecommunications sector for creating, maintaining and terminating sessions.

Due to the increasing popularity of SIP and SOAP, and the corresponding investments in both standards/technologies by market leading companies, interesting opportunities will arise associated with the creation of convergent applications that cross the boundaries of individual protocol domains. For instance, convergence between SIP and SOAP enables applications such as: Web services initiated multimedia sessions where SIP multimedia sessions are initiated based on the received SOAP message, Sensor network integration applications where sensor networks that provide their functionality through SIP can be exposed as Web Services, and Dial to service applications where a SOAP service is activated upon reception of a call to a specific telephone number. There are existing solutions that utilize SIP and Web Services (SOAP) at the same time. However, these solutions do not, among other things, enable a controlled conversion and coordination between SIP and SOAP protocols.

For example, XML Global Session Protocol (XGSP), as described in an article by Geoffrey Fox, Wenjun Wu, Ahmet Uyar, and Hasan Bulut, entitled "A Web Services Framework for Collaboration and Audio/Videoconferencing", The 2002 International Multiconference in Computer Science and Computer Engineering, Internet Computing (IC '02), June 2002, Las Vegas, coordinates multiple videoconferencing clients and servers, which are using different protocols (e.g., H.323, SIP, AccessGrid). However, not all of these clients and servers are using SOAP. Thus, XGSP does not offer any SIP to SOAP or SOAP to SIP conversion, and does not handle coordination of multiple SIP/SOAP messages. Instead, XGSP uses SOAP to enable communication between the clients and servers using disparate protocols (i.e., X.323 and SIP).

IBM Corporation offers a product which it refers to as its IMS SOAP Gateway server. According to IBM's description of this product, the IMS SOAP Gateway enables SOAP requests to reach SIP applications and functionalities. Upon reception of SOAP message from a client application, the gateway converts it to a SIP message, and sends the SIP message into a SIP network toward a designated application or functionality. The gateway then receives a SIP output message from SIP and converts it to a SOAP message which is sent back to the client. Conversion of SOAP messages to SIP messages is described in correlator files used by the gateway. However, there is apparently no possibility to specify conversion of SIP messages into SOAP messages in this gateway product. Moreover, the number of applications that the IMS SOAP Gateway can serve at once is dictated by the number of correlator files and back-end SIP applications.

Avaya Inc. offers various products, e.g., Avaya SOA, Avaya SIP Application Server, Avaya Communications Process Manager, etc., which enable access to telecommunications' infrastructure and functionalities through web services (SOAP). These solutions apparently include numerous services that communicate with the telecommunications infrastructure using the SIP protocol. The services are also wrapped as Web Services that enables developers to access telecommunications infrastructure using SOAP requests. However, these Avaya products apparently do not include a solution for generalized conversion between SIP and SOAP.

Accordingly, it would be desirable to provide systems and methods for dynamically adaptive, multi-way message conversion, e.g., SIP to SOAP and SOAP to SIP.

SUMMARY

According to an exemplary embodiment, a system for converting a first message type into a second message type includes: a message receiver which uses a specification of peers to handle incoming messages, a session correlator which uses session correlation rules to map the incoming messages to a session and to create new sessions, a condition matcher which uses matching rules and current session information to determine a set of actions to be performed to convert one of the incoming messages into an outgoing message, an action executor which uses an action specification to create outgoing messages, and a message sender for sending said outgoing messages.

According to another exemplary embodiment, a method for transmitting messages between protocols includes the steps of: receiving an incoming first message which uses a first protocol, correlating the incoming first message to a binding session, converting the incoming first message to an outgoing first message which uses a second protocol that is different than the first protocol, transmitting the outgoing first message, receiving an incoming second message which uses the second protocol, correlating the incoming second message to the binding session, converting the incoming second message to an outgoing second message which uses the first protocol, and transmitting the outgoing second message.

According to still another exemplary embodiment a computer-readable medium contains instructions which, when executed on a processor, perform the steps of: converting a received Session Initiation Protocol (SIP) message into a corresponding Simple Object Access Protocol (SOAP) message based on one of a plurality of different sets of conversion rules; and converting a received SOAP message into a corresponding SIP message based on another one of the plurality of different sets of conversion rules.

BRIEF DESCRIPTION OF THE DRAWINGS

The accompanying drawings illustrate exemplary embodiments, wherein:

FIG. 5 depicts an exemplary PCCL specification according to an exemplary embodiment;

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
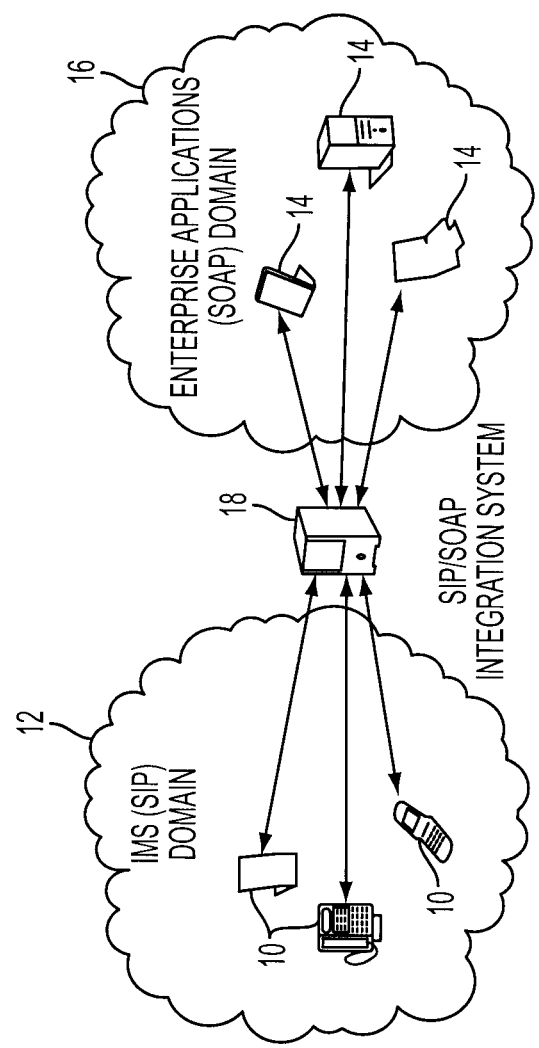
FIG. 1 shows an integration system disposed between a SIP domain and a SOAP domain according to an exemplary embodiment.

Applications that cross SIP-SOAP boundaries are faced with several challenges that need to be overcome in order to provide an easy to use integration technology. First, in order for a SIP-SOAP integration system to achieve SIP-SOAP convergence, it should support multi-way conversion and coordination of SIP and SOAP protocols. This characteristic of multi-way conversion and coordination refers to the capability of a SIP-SOAP integration system according to exemplary embodiments to, for example, coordinate the exchange of messages among multiple SIP and SOAP parties as indicated conceptually in FIG. 1. Therein, a number of devices 10 operating in the IMS (SIP) domain 12 are able to readily communicate with a number of other devices 14 which are operating in an enterprise (SOAP) domain 16 by passing messages through a SIP/SOAP integration/conversion system 18. Additionally, these exemplary systems and techniques for multi-way conversion and coordination enable for the coordination of messages to be initiated by either a SIP or SOAP message. As will be described in detail below, after reception of an initiating SIP or SOAP message, a session of a convergent application is started and a set of SIP and SOAP messages is coordinated and converted within that session according to these exemplary embodiments.

SIP-SOAP convergent applications which operate in conjunction with systems and methods according to these exemplary embodiments may need to be implemented rapidly and may also need to be modified frequently (for example, consider a convergent application that allows SIP-based access to the enterprise infrastructure of the Olympic games). Thus, SIP-SOAP integration methods and systems according to these exemplary embodiments are also, preferably but not necessarily, dynamically adaptive. This characteristic of dynamic adaptiveness of SIP-SOAP integration systems and methods according to exemplary embodiments refers to the capacity for the same integration system to be used to manage multiple SIP-SOAP convergent applications, e.g., simultaneously. Moreover, in some situations the requirements of a SIP-SOAP convergent application may change while the convergent application is being executed. Accordingly, some exemplary embodiments provide for integration systems and methods which have the option to dynamically modify running SIP-SOAP convergent applications, e.g., on the fly.

Thus, according to exemplary embodiments, an integration system 18 enables controlled, dynamic coordination and conversion of SIP and SOAP messages in both directions, thereby enabling further the creation of converged SIP-SOAP applications which operate using the integration system 18. Among other things, integration system 18 enables the reception of incoming SIP and SOAP messages, the binding of SIP and SOAP messages to existing or newly created sessions, the translation of SIP and SOAP messages to outgoing SIP and SOAP messages, and the sending of outgoing SIP and SOAP messages. Furthermore the system enables the coordinated exchange of the set of SIP and SOAP messages between SIP and SOAP peers (e.g., clients and/or servers). According to some exemplary embodiments, the rules for converting and coordinating messages are specified in a formal description (language). The conversion and coordination rules are plugged in into the system 18, which later executes the conversion and coordination of messages in accordance with the rules specified in the language.

Figure 2:
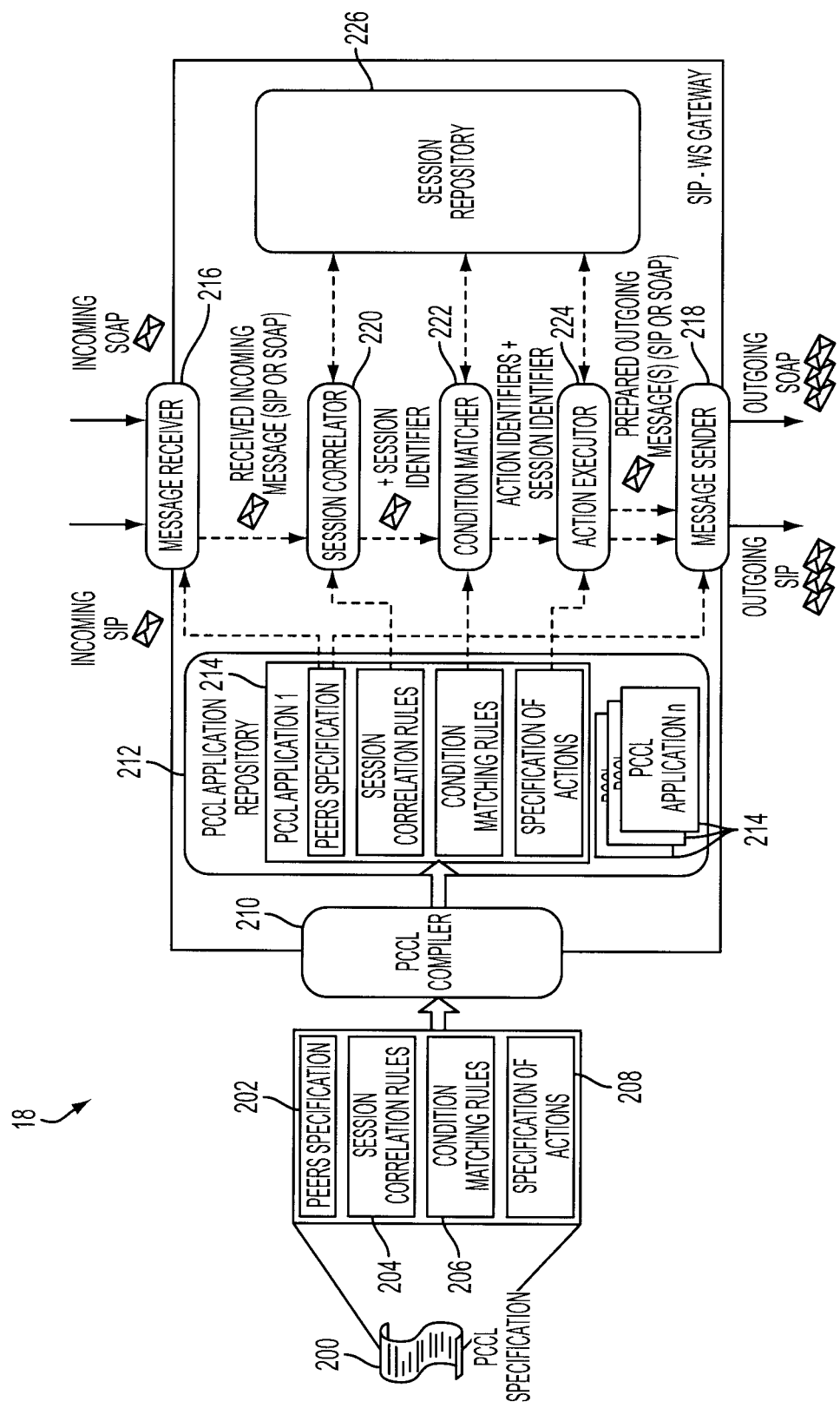
FIG. 2 illustrates an integration system according to an exemplary embodiment.

FIG. 2 illustrates an integration system or device 18 according to an exemplary embodiment. Therein, starting at the lefthand side of the Figure, a Protocol Conversion and Coordination Language (PCCL) specification 200 contains the rules that govern the conversion and coordination process. According to this exemplary embodiment, the PCCL specification 200 has four sections: (1) a specification 202 of peers that are coordinated, (2) a set 204 of session correlation rules that enable the correlation of messages with a PCCL session (also referred to herein as a "binding session"), (3) a set 206 of rules for matching various conditions that govern the actions that need to be taken for message conversion, and (4) the specification 208 of actions themselves. Each of these sections is described in considerable more detail below under the heading "Exemplary PCCL Specification". Additionally, it will be appreciated by those skilled in the art that both the name PCCL and the use of such a formal description/language are purely illustrative mechanisms for implementing integration systems and methods according to these exemplary embodiments.

The PCCL specification is compiled (or otherwise translated) into an executable form by PCCL compiler 210, which form is referred to herein as a "PCCL application", that is stored in the PCCL application repository 212. The application repository 212 can, for example, contain multiple PCCL applications 214 that are all executing simultaneously within the integration system 18. According to one exemplary embodiment, each PCCL application 214 contains the same rules as the PCCL specification 200 but in a form that can be plugged into the modules of the integration system 18, which system is also referred to in the Figure as a "SIP-WS gateway". Each PCCL application 214 can handle many simultaneous message exchanges. For example, the same PCCL application 214 can be run simultaneously for multiple clients. For this reason, each PCCL application 214 according to this exemplary embodiment coordinates a message exchange between SIP and SOAP within a PCCL session. Each time the integration system (gateway) 18 receives a SIP or SOAP message it uses the PCCL application 214's definitions to create a PCCL session if the appropriate session is not already started, or uses the PCCL session repository 226 to correlate the message to an already active PCCL session. So, PCCL applications 214 can be thought of as a message exchange pattern that, among other things, is used for correlating messages to existing PCCL sessions, or for creating a new PCCL session. An exemplary procedure performed by session correlator 220 for creating PCCL sessions and correlating messages to existing sessions is described below with respect to FIG. 3.

The coordination and conversion rules stored in a PCCL application 214 are also used by the other modules of the SIP-WS gateway 18 as will now be described. For example, the message receiver 216 and message sender 218 are interfaces which use the PCCL application 214 to obtain the specification of coordinate peers stored therein. The message receiver 216 uses this information so that it knows the format of SOAP messages that are going to be received (i.e., related to the WSDL description of Web Services). The message sender 218 uses this information so that it knows the format of SOAP messages that it will send, and the locations (URLs) of the SOAP and SIP peers that the message sender 218 is going to communicate with. Consider, for example, various categories of incoming and outgoing messages as described below.

SIP Messages that are Incoming from SIP Peers

These messages can initiate new binding session. The gateway system 18 does not need any peer knowledge for these messages, since all the knowledge required is included in the received message (peer address). The address where the message receiver 216 receives the SIP message can be specified otherwise.

SIP Messages that are Outgoing to SIP Peers.

These are the messages that the gateway system 18 sends to some SIP peers, e.g., as a part of some PCCL application. For some peers the gateway 18 needs to know the address to which the message should be sent (e.g., this knowledge is needed only if the gateway 18 initiates communication with the SIP peer, i.e. sends the first message to peer). The message sender 218 uses this knowledge to direct the message to the appropriate address.

SOAP Request Messages that are Incoming from SOAP Clients.

The gateway system 18 needs to know the exact format of the SOAP messages that are going to be received (specified via WSDL specification). The message receiver 216 for SOAP messages uses this format information to parse/unpack the received messages. Furthermore, the gateway system 18 needs to know on which address (i.e., URL) it should receive the SOAP message. Based on this knowledge, the gateway 18 can start the SOAP message receiver 216 on the appropriate URL to listen for incoming messages.

SOAP 'Response' Messages that are Outgoing to SOAP Clients.

These messages are responses to incoming SOAP request messages to the gateway system 18 from SOAP clients as described above. The gateway system 18 needs to know the exact format of the messages (provided via WSDL of the service) so that it can format the response message appropriately and send the SOAP response to the client that issued a call. The address of the client is not required, as it can be determined from the received message.

SOAP 'request' messages that are outgoing to SOAP servers (web service server). The gateway system 18 needs to know the exact format of the SOAP message that is to be sent (specified via WSDL specification). The SOAP sender uses this information to pack/format the outgoing message appropriately. Furthermore, the address (URL) of the server that provides the web service should also be provided, so that the message sender can direct the message to the appropriate address.

SOAP 'Response' Messages that are Incoming from SOAP Servers.

These messages are responses to SOAP request messages that were sent from the gateway system 18 to SOAP servers as described above. To compose these messages, the gateway system 18 needs to know the exact format of the messages (provided via WSDL of the service) and no other data. As described above, it will be noted that not all peers need to be specified in the peer specification portion of a PCCL application 214, since some peers can be determined implicitly (e.g., peers that invoke the entire message exchange process do not have to be explicitly specified).

The session correlator 220, as mentioned above, uses the rules from the PCCL application 214 to determine the mapping between the messages exchanged and a particular PCCL session (i.e., binding session). The stated rules enable creation of new binding sessions, and mapping of messages to existing sessions. Note that according to exemplary embodiments, PCCL (binding) sessions are neither SIP sessions nor any kind of SOAP sessions. The binding sessions instead provide the integration system 18 with a mechanism for correlating multiple SIP and SOAP sessions. Thus, messages belonging to different SIP and SOAP sessions can be bound to the same PCCL (binding) session (e.g., multiple SIP and SOAP clients and servers can be bound to the same PCCL (binding) session—this enables data sharing and coordination between different SIP and SOAP sessions). Ongoing PCCL (binding) sessions are stored in session repository 226, which also provides functionality for storing and fetching session data. A detailed, yet purely exemplary, process which can be performed by session correlator 220 will now be described with respect to FIG. 3.

Figure 3:
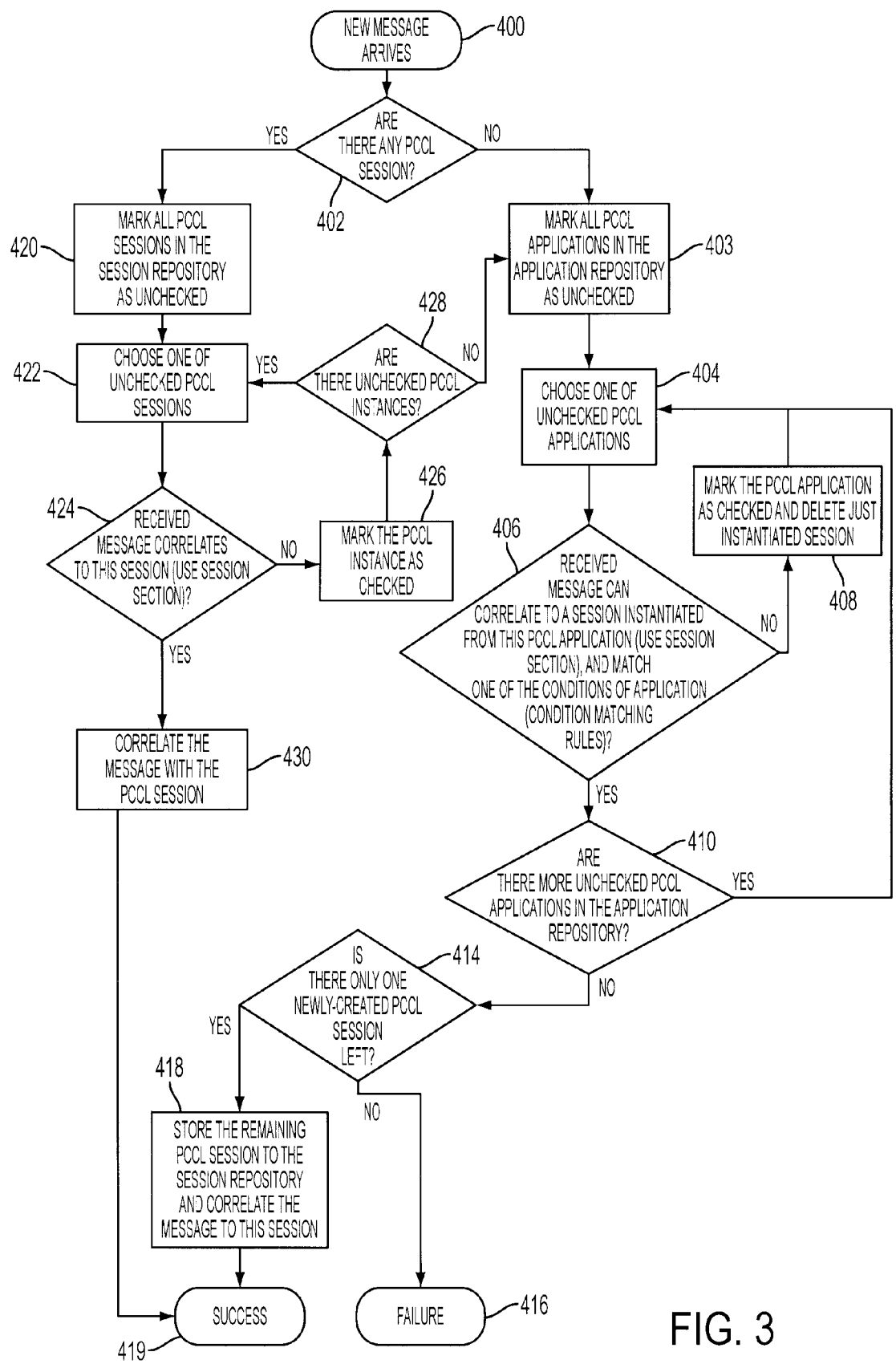
FIG. 3 is a flowchart illustrating a method for session correlation according to an exemplary embodiment.

FIG. 3 illustrates an exemplary process which correlates a particular SIP or SOAP message 400 to a PCCL application 214 and session 300 (shown in FIG. 4) and, also, creates a PCCL session 300 when needed. As indicated by the decision block 402, there are two distinct cases that are illustrated in the exemplary method of FIG. 3. In the first case (righthand branch leaving from decision block 402), there are no PCCL sessions 300 active when the message 400 arrives. In this case, it is necessary to create a new PCCL session 300. This is accomplished by iterating through steps 403, 404, 406, 408 and 410 as shown in FIG. 3. The goal of this iteration process is to find all PCCL applications 214 whose session correlation and condition matching rules can be applied to the received message 400 and to create new sessions for these PCCL applications 214. In step 403 all PCCL applications 214 are unchecked. Then, in step 404, an unchecked PCCL application 214 is selected for a trial session and condition matching process. In step 406 a new session 300 is created (i.e., instantiated from selected PCCL application 214) and that new session is tested by applying the condition matching rules of the selected PCCL application 214 on the received message 400. If the received message 400 does not match the rules, then step 408 deletes the newly created session 300, and checks (marks) the selected PCCL application 214 to indicate that it has been considered. Otherwise, the newly created session 300 is kept. Step 410 assures that all PCCL applications 214 from PCCL application repository are being considered as a possible match for received message 400. The normal functioning of the system is checked at step 414 by verifying that only one new session is created, otherwise the process fails (step 416). If at step 414 existence of only one new session has been confirmed, the remaining (newly created) PCCL session is stored in the repository at step 418.

If, on the other hand, there already are some PCCL sessions 300 in existence when the message 400 is received, then the processing flow follows the lefthand path leaving block 402. In such a case, the PCCL applications 214 of the existing PCCL sessions 300 are checked to determine whether they can recognize the received message 400, as indicated by the loop including steps 420-428. If the message 400 is recognized as belonging to a particular session 300 (i.e., based on the received SIP headers or SOAP message contents), then that message 400 is correlated with the particular PCCL session 300 at step 430. All the PCCL sessions 300 are checked via loop 420-428 until a correlation is found (at which time the flow proceeds to block 419) or until there are no more PCCL sessions to be checked. If the received message 400 cannot be correlated to any of the existing PCCL sessions 300, then the flow proceeds to block 404 to process the message 400 as if there were no existing sessions, i.e., to create a new session based on an existing PCCL application 214.

Returning to the exemplary integration system 18 shown in FIG. 2, the condition matcher 222 uses the condition matching rules of a PCCL application 214 to make a decision about a set of actions that are going to be executed to perform a particular conversion, e.g., SIP to SOAP or SOAP to SIP. The matching rules provided by the corresponding section within the PCCL application 214 specify conditions that are checked against the message content and the session repository 226. The action executor 224 uses the actions rules from the PCCL application 214 to execute actions, i.e., to actually perform conversions. The action rules provided by the corresponding section of the PCCL application 214 can, for example, support at least four types of operations: (1) operations to extract some data from messages and store them in the session repository 226, (2) operations to get some data from the session repository 226 and enter it into outgoing messages, (3) operations to generate outgoing SIP and/or SOAP messages, and (4) operations that explicitly terminate a specific PCCL (binding) session. In order to better understand the interaction between the elements illustrated in FIG. 2, a specific (yet purely illustrative) set of exemplary message conversions is provided below following the header entitled "Exemplary Message Conversion".

Exemplary PCCL Specification

As mentioned earlier, according to exemplary embodiments, integration system 18 and corresponding methods may use a Protocol Conversion and Coordination Language (PCCL) to create a system that converts SIP messages to SOAP web services' messages and vice-versa. Furthermore, such a language enables coordination of several SIP and SOAP messages into a predefined message exchange pattern. The language provides this functionality according by defining the rules for creating and activating SOAP messages from the received SIP message and vice-versa. PCCL is also responsible, according to these exemplary embodiments, for bridging the gap between the SIP's statefulness and SOAP's statelessness by, for example, specifying active session data. According to one exemplary embodiment, the PCCL language is based on XML because XML is widespread, easy to parse and human-readable. PCCL manipulates SIP and SOAP messages by extracting specific data from their headers and bodies and creating new SIP and SOAP messages using, for example, 'if condition then action' rules.

To better understand a PCCL which can be used according to exemplary embodiments, Table 1 shows the general outline of an exemplary PCCL specification 200. As previously described, the PCCL specification 200 according to this exemplary embodiment includes four sections, i.e., Coordinated Peers, Session, Conditions and Actions, which are contained within the <PCCL> tag. Each of these PCCL sections are further described below.

TABLE 1

```
<PCCL>
    <coordinated-peers>
        ...
    </coordinated-peers>
    <session name="...">
        ...
    </session>
    <conditions>
        ...
    </conditions>
    <actions>
        ...
    </actions>
</PCCL>
```

Figure 4:
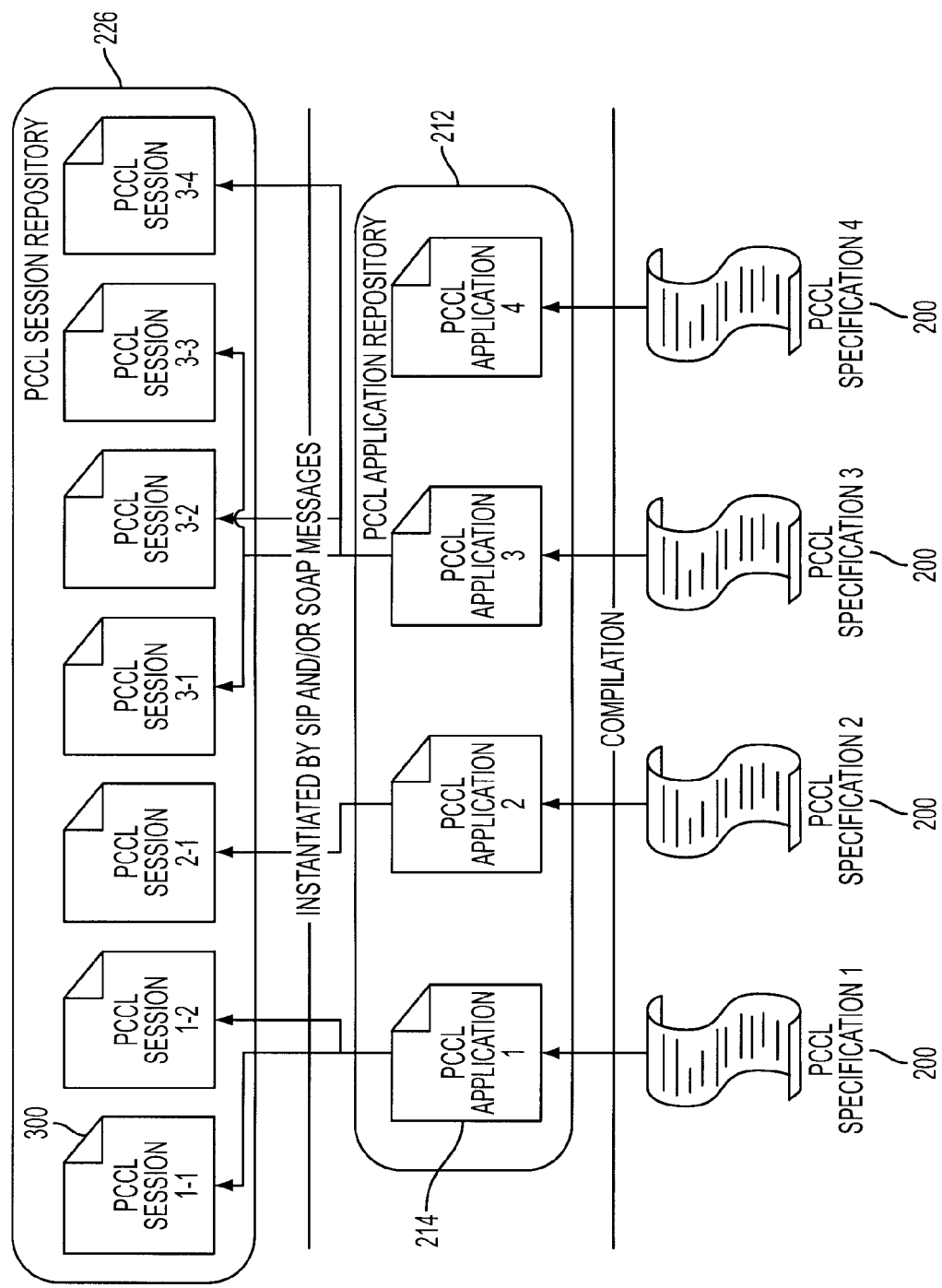
FIG. 4 depicts a relationship between a specification, application and session according to another exemplary embodiment.

FIG. 4 illustrates an exemplary relationship between PCCL specifications 200, applications 214 and sessions. As mentioned earlier, the PCCL specifications 200 describe the conversion and coordination between SIP and SOAP protocols using the PCCL language and the PCCL applications 214 are the compiled form of the PCCL specifications 200. PCCL sessions 300 are PCCL application instances that are currently executing. While PCCL sessions 300 of the same PCCL application 214 typically share the same application-logic, i.e., the same Coordinated Peers, Session, Conditions and Actions sections, each PCCL session 300 typically has different session data (e.g., data in variables that hold the internal state of the session). For example, the PCCL Session 1-1 in FIG. 3 could be near the end of its lifecycle (message exchange), while the PCCL Session 1-2 can could be just starting. Thus, according to one exemplary embodiment, there is one PCCL application 214 associated with each PCCL specification 200, and there can zero or more PCCL sessions 300 for each PCCL application 214.

PCCL sessions 300 are thus generally used according to exemplary embodiments to correlate several SIP and SOAP messages to one PCCL application (message exchange pattern). The PCCL sessions 300 are not necessarily directly related to SIP sessions, but can use some of the session identification mechanisms that are used in SIP. For example, PCCL sessions 300 can utilize a Call-ID SIP header in performing a session correlation process. On the other hand, SOAP has no inherent session support. However, SOAP uses a request-response architecture that correlates the request and the corresponding response message. PCCL sessions 300 are identified based on the rules that are specified in the session section of the PCCL specification 200. The rules use SIP message headers (i.e. Call-ID) and SOAP message parameters to identify a PCCL session 300. Each of the four sections within an exemplary PCCL specification 200 or PCCL application 214 will now be described in more detail below by way of example.

As mentioned above, the Coordinated Peers section defines the peers that are coordinated in the PCCL application 214. In this context, the peers are external systems that communicate with the SIP-WS gateway (integration system 18) using SIP and/or SOAP messages. Table 2 illustrates an outline of an exemplary Coordinated Peers section.

TABLE 2

```
<coordinated-peers>
  <SIP name="peer1">
  ...
  </SIP>
  <SIP name="peer2">
  ...
  </SIP>
  ...
  <WS name="ws1">
  ...
  </WS>
  <WS name="ws2">
  ...
  </WS>
  ...
</coordinated-peers>
```

SIP peers can, for example, be SIP clients or SIP servers and, in some cases, retrieving information regarding SIP clients from the Coordinated Peers section is not required. For instance, when the integration system 18 receives an initial application message from a SIP client, the integration system 18 automatically knows the address of the sender, because it is included in the message itself. SIP peer information will, however, typically be needed from the Coordinated Peers section when an outgoing SIP message is created without previously receiving an incoming SIP message (i.e., when creating a SIP message upon receiving a SOAP message).

Table 3 illustrates a SIP peer definition according to an exemplary embodiment. The SIP peers define the name of the peer, the address of the SIP peer and the SIP listening port of that peer. The name of the peer is used as a reference of the peer in the remaining sections of the PCCL specification 214.

TABLE 3

```
<SIP name="peer1">
  <address>
    my.domain.com
  </address>
  <port>
    5060
  </port>
</SIP>
```

Similarly, SOAP peers are typically SOAP clients or SOAP services. SOAP clients and services that an application communicates with should be defined in the Coordinated Peers section of a PCCL application 214. This is because SOAP does not define the complete message contents of each SOAP message. Instead, SOAP defines a holder for message content. The exact content of a particular SOAP message is defined by WSDL. Thus, for external SOAP services, the Coordinated Peers section defines the address and the WSDL that describes the actual content of SOAP messages sent. Furthermore, for SOAP clients, the Coordinated Peers section defines the WSDL of the service that the integration system 18 implements in order for clients to be able to create appropriate SOAP messages. Table 4 illustrates a SOAP peer which defines a web service interface according to an exemplary embodiment. Each web service definition has a name, the location of its WSDL, the location of the service and the address of the web service's host. The name of the web service is used as a reference in the remaining sections of the PCCL specification 214.

TABLE 4

```
<WS name="scientiobot">
  <wsdl>
    http://192.168.0.2/Service.asmx?WSDL
  </wsdl>
  <location>
    http://192.168.0.2/Service.asmx
  </location>
  <host>
    192.168.0.2
  </host>
</WS>
```

As mentioned above with respect to FIG. 2, the definition of peers provided by the Coordinated Peers section of a PCCL application 214 is used in, for example, the Session, Conditions and Actions sections. The Actions section uses definition of SIP peers for creating outgoing SIP messages. The Sessions and Conditions sections use definition of SOAP peers to identify the PCCL application and session that will process the message, while the Actions section uses the SOAP peer definitions to create outgoing SOAP messages. In the PCCL specification 200 (and PCCL application 214) the definitions of coordinated peers are used as name references. For instance, after specifying peer P1, in the session correlation rules it could be stated that a particular message needs to come from peer P1. On the other hand, the same definitions of peers can be used in the session correlator 220, condition matcher 222, and action executor 224 as instructions regarding how to perform the actual message conversion tasks.

As described above, the Session section contains the definition of the PCCL session 300 including, for example, the variables that store the data from SIP and SOAP messages, and, optionally, additional variables that maintain the session state. Table 5 illustrates an outline of an exemplary Session section according to an exemplary embodiment.

TABLE 5

```
<session name=...>
  <var ... />
  ...
</session>
```

Regarding additional variables associated with the session state, consider the following example. Suppose a message exchange pattern being handled by the gateway system 18 involves twelve messages (SIP and/or SOAP). During the coordination of this message exchange pattern the gateway system 18 will need to know how many messages have already been received, and the identity of the next message to be received. This type of information can be stored in an additional PCCL session variable called 'sessionState'. After receiving the first message of the exchange pattern, the gateway system 18 can set 'sessionState=firstReceived', after sending the second message the gateway system 18 can set 'sessionState=secondSent', and so on. This session variable can later be used as a part of the condition matching process to determine the set of actions that should be performed. Moreover, as can be seen from this example, the session variable 'sessionState' does not store any data that was received via messages, rather it holds data that shows the overall state of the messages exchange pattern. Of course, in a more complex message exchange pattern there might be more state variables.

Table 6 below presents an example of the Session section. According to an exemplary embodiment, the Session section has a name, which is used in the remainder of the PCCL specification 200 as a namespace reference when accessing the session data. Each variable in the Session section is identified by a name and type. If the variable is used as the PCCL session identifier, then the location of the identifier in the SIP or SOAP message is provided. SIP message based identifiers need only the name of the SIP header, however SOAP message based identifiers need the web service name, operation and the type of SOAP message (defined in the Coordinated Peers section through WSDL).

TABLE 6

```
<session name="mySession">
   <var name="sessionID1" type="string"
       idn="true" location="SIP:header:call-id" />
       <var name="sessionID2" type="int"
       idn="true" location="SOAP:body:sessionID"
       wsName="scientiobot" wsMethod="getData"
       wsType="response" />
   <var name="state" type="string" />
   ...
</session>
```

The Conditions section of a PCCL specification 200 or PCCL application 214 defines the condition part of the 'if condition then action' rules for activating actions. Table 7 below presents the outline of the Conditions section. According to this exemplary embodiment, the Conditions section contains two protocol blocks. One protocol block defines matching for SIP messages, while the other defines matching for SOAP messages.

TABLE 7

```
<protocol name="SIP">
   ...
</protocol>
<protocol name="SOAP">
   ...
</protocol>
```

Each protocol block in the Conditions section contains message blocks. Message blocks contain the rules that apply to messages. For example, the exemplary message block illustrated below in Table 8 defines the matching rule that matches all SIP SUBSCRIBE messages. Further subelements of the of the SIP message block specify additional matching requirements. For instance, one subelement could specify that the received message 400 is matched to a particular message block only if the content of the SIP Expires header is greater than 1.

TABLE 8

```
<protocol name="SIP">
   <message type="SUBSCRIBE">
   ...
   </message>
</protocol>
```

According to exemplary embodiments, SOAP message blocks can be declared differently from SIP message blocks in the Conditions section. For example, SOAP message blocks include the web service name, which is defined in the Coordinated Peers section, the operation name and the message type. An example of a SOAP message block is provided below in Table 9.

TABLE 9

```
<protocol name="SOAP">
   <message name="getSensorData" service="ws1"
   type="Response">
   ...
   </message>
</protocol>
```

The PCCL syntax allows for definition of matching rules that can compare parts of the SIP and/or SOAP messages to constant values, which values are stored in the session data. Another subelement of the message blocks provided in the Conditions section of the PCCL specifications 200 and PCCL applications 214 are the set of actions that should be executed when a message matches the message block. For instance, in the Conditions section example shown below in Table 10, if the received message is SOAP response message for the service ws1 and operation getSensorData, and the session state variable contains the string 'OTS' then the actions: action002 and action003 are executed.

TABLE 10

```
<protocol name="SIP">
   <message type="SUBSCRIBE">
      <if>
         <EQ left="header:expires" right="1" type="int" />
         <exec>
            action001
         </exec>
      </if>
      <else-if>
         <GT left="header:expires" right="1" type="int" />
         <exec>
            action100
            action101
            action102
         </exec>
      </else-if>
   </message>
</protocol>
<protocol name="SOAP">
   <message name="getSensorData" service="ws1"
   type="Response">
      <if>
         <EQ left="$mysession.state" right="OTS"
      type="string" />
         <exec>
            action002
            action003
         </exec>
      </if>
   </message>
</protocol>
```

The Actions section defines the actions of a PCCL application 214 including, for example, extraction of data from SIP and SOAP messages, storing the extracted data as session data, and creation of new SIP and/or SOAP messages. Table 11 presents an exemplary outline of the Actions section.

TABLE 11

```
<actions>
    <action name=... inType=...>
        ...
    </action>
    ...
</actions>
```

The Actions section contains action blocks. Each action block corresponds to an action that is referenced in the Conditions section by its name. Table 12 presents an exemplary outline of an action block.

TABLE 12

```
<action name= ... >
    <get ...>
    ...
    </get>
    ...
    <set .../>
    ...
    <send ...>
    ...
    </send>
    ...
</action>
```

Action blocks can, for example, include a set of GET, SET and SEND methods. The methods of an action block can be executed sequentially and communicate among each other using session and local variables. Local variables are treated equally as session variables, but are visible only within a single action. The GET method enables the extraction of data from SIP and/or SOAP messages and the storing of that extracted data to session and local variables. The SET method enables storing constants into PCCL session variables and local variables, while the SEND method allows for creation and sending of outgoing SIP and SOAP messages.

Table 13 shows an example of a GET method according to an exemplary embodiment which can, for example, be part of an Actions section of a PCCL specification 200 or PCCL application 214. Therein, the GET method defines the location and type of the data that is extracted, and the name of the variable that will store the data. In addition, the data can be manipulated through regular expression so that only the parts of the data are extracted. The GET method in Table 13 extracts the value of the Call-ID header from a SIP message and stores it in the call-id variable defined in the PCCL session.

TABLE 13

```
<action name="action001" >
    <get type="string" location="header:call-id">
        $mySession.call-id$
    </get>
    ...
</action>
```

Table 14 shows an example of a SET method according to an exemplary embodiment which can, for example, be part of an Actions section of a PCCL specification 200 or PCCL application 214. Therein, the SET method defines the name of the variable, the type of the variable and its value.

TABLE 14

```
<action name="action001">
    ...
    <set name="mysession.state" type="string"
    value="waiting-SIP-OK" />
    ...
</action>
```

The SEND action defines the type of the message that is sent and the content of that message. The SEND method differs between SIP and SOAP messages. For example, Table 15 shows an example of SEND method for SIP messages which can be used in the Action section. The SEND method for SIP messages defines the SIP message type and, furthermore, can define headers of the SIP message and the body content of the SIP message. The values for the headers can be extracted from constants, session variable and local variables.

TABLE 15

```
<action name="action001">
    ...
    <send protocol="SIP" type="NOTIFY">
        <header name="Event" value="sensor" />
        <header name="subscription-state" value="Active" />
        <header name="Content-Type" value="text/plain" />
        <header name="CSeq" value ="1 NOTIFY" />
        <header name="Expires" value="1" />
        <body>
            $notify_body$
        </body>
    </send>
    ...
</action>
```

Table 16 shows an example of SEND method for SOAP messages. The SEND method for SOAP messages defines the name of the service called, the operation called and the type of the message (i.e., request vs. response). The values of the SOAP message variables are provided from the session variables, local variables or entered as constants.

TABLE 16

```
<action name="action001">
    ...
    <send protocol="SOAP" name="getSensorData"
    type="Request"
        service="ws1">
        <arg name="roomID" type="string">
            $mySession.roomID$
        </arg>
    </send>
    ...
</action>
```

Table 17 presents an example of a complete Actions section. The example defines two action blocks. The first action block contains one GET method, one SET method and two SEND methods. The second action block contains a GET method and a SEND method.

TABLE 17

```
<actions>
    <action name="start">
        <get type="string" location="body">
            $mySession.chat$
        </get>
        <set name="state" type="string" value="waiting-for-SOAP" />
        <send protocol="SIP" type="OK" />
```

TABLE 17-continued

```
            <send protocol="SOAP" name="getGUIDForUser"
                    type="Request" service="scientiobot">
                <arg name="Username" type="string">
                    "Ivo Budis"
                </arg>
                <arg name="PersonalityID" type="string">
                    "f39bbd86-30fd-45a2-a571-48b309f828e5"
                </arg>
            </send>
        </action>
        <action name="ask" inType="SOAP">
            <get type="string"
                    location="body:getGUIDForUserResult">
                $mySession.sessionID$
            </get>
            <send protocol="SOAP" name="Chat" type="Request"
                    service="scientiobot">
                <arg name="Input" type="string">
                    $mySession.chat$
                </arg>
                <arg name="SessionGUID" type="string">
                    $mySession.sessionID$
                </arg>
            </send>
        </action>
    </actions>
```

To tie all of these various examples of the different sections of a PCCL specification 200 or PCCL application 214 together, a complete example is illustrated as FIG. 5.

Exemplary Message Conversion

Figure 6:
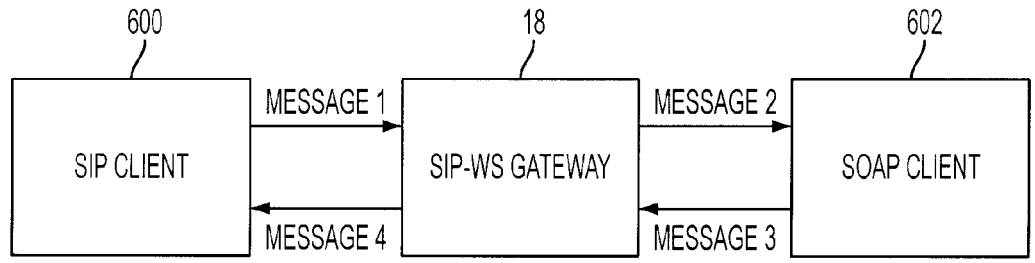
FIG. 6 shows message conversion between two peers according to an exemplary embodiment.

Having now described both an overview of an integration system 18 and corresponding methods, as well as an exemplary PCCL, a specific (yet purely illustrative) example of an end-to-end message conversion which can be performed using the systems, devices and methods described above will now be described beginning with FIG. 6. Therein, integration system 18 is disposed between a SIP client device 600 and a SOAP client device 602. A SIP message (msg.1) is transmitted from the SIP client device 600 to the integration system 18, where it is translated into a corresponding SOAP message (msg.2) and forwarded to SOAP client 602. In the reverse direction, a SOAP message (msg.3) is transmitted from the SOAP client 602 to the integration system 18, where it is translated into a corresponding SIP message (msg.4) and forwarded to SIP client 600. All of these translations are performed in accordance with a PCCL specification 200 which is provided in the integration system for this purpose (and which is provided below). Additionally, all four messages shown in FIG. 6 are correlated to a single PCCL (binding) session 300 which is managed by the integration system 18 as described above. Below are examples of the PCCL specification 200 (or the PCCL application 214), and each of the four messages indicated in FIG. 6.

```
<PCCL>
    <coordinated-peers>
        <WS name="ws1">
            <wsdl>
                http://192.168.0.2/WS/Service.asmx?WSDL
            </wsdl>
            <location>
                http://192.168.0.2/WS/Service.asmx
            </location>
            <host>
                192.168.0.2
            </host>
        </WS>
    </coordinated-peers>
    <session name="mySession">
        <var name="roomID" type="string" />
        <var name="state" type="string" />
        <var name="id" idn="true" type="string"
                location="SIP:header:from:tag" />
        <var name="contact" type="string" />
        <var name="from" type="string" />
        <var name="to" type="string" />
        <var name="cseq" type="string" />
        <var name="call-id" type="string" idn="true"
                location="SIP:header:call-id" />
        <var name="via" type="string" />
        <var name="notifyBody" type="string" />
        <var name="sessID3" type="string" idn="true" wsName="ws1"
                wsMethod="GetSensorData" wsType="Response"
                location="SOAP:body:roomID" />
    </session>
    <conditions>
        <protocol name="SIP">
            <message type="SUBSCRIBE">
                <condition>
                    <if>
                        <EQ left="header:expires" right="1" type="int" />
                        <exec>
                            action001
                        </exec>
                    </if>
                </condition>
            </message>
        </protocol>
        <protocol name="SOAP">
            <message name="getSensorData" service="ws1"
                    type="Response">
                <condition>
                    <if>
                        <EQ left="state" right="OTS" type="string" />
                        <exec>
                            action002
                            action003
                        </exec>
                    </if>
                </condition>
            </message>
        </protocol>
    </conditions>
    <actions>
        <action name="action001" inType="SIP">
            <get type="string" location="header:from:tag">
                $mySession.id$
            </get>
            <get type="string" location="header:method=?room*">
                $mySession.roomID$
            </get>
            <get type="string" location="header:contact">
                $mySession.contact$
            </get>
            <get type="string" location="header:from">
                $mySession.from$
            </get>
            <get type="string" location="header:to">
                $mySession.to$
            </get>
            <get type="string" location="header:cseq">
                $mySession.cseq$
            </get>
            <get type="string" location="header:call-id">
                $mySession.call-id$
            </get>
            <get type="string" location="header:via" >
                $mySession.via$
            </get>
            <set name="mySession.state" type="string" value="OTS" />
            <send protocol="SIP" type="OK" />
            <send protocol="SOAP" name="getSensorData"
                    type="Request" service="ws1">
                <arg name="roomID" type="string">
                    $mySession.roomID$
                </arg>
            </send>
        </action>
        <action name="action002" inType="SOAP">
```

-continued

```
    <get type="string" location="body:getSensorDataResult">
        $notify_body$
    </get>
    <send protocol="SIP" type="NOTIFY">
        <header name="Event" value="sensor" />
        <header name="subscription-state" value="Active" />
        <header name="Content-Type" value="text/plain" />
        <header name="CSeq" value ="1 NOTIFY" />
        <header name="Expires" value="1" />
        <body>
            $notify_body$
        </body>
    </send>
</action>
<action name="action003" inType="SIP">
    <set name="mySession.state" type="string" value="OTS" />
    <send protocol="SIP" type="NOTIFY">
        <header name="Event" value="sensor" />
        <header name="subscription-state" value="Terminated" />
        <header name="CSeq" value="2 NOTIFY" />
        <header name="Expires" value="1" />
    </send>
    <terminateBindingSession/>
</action>
</actions>
</PCCL>
```

SIP→SOAP Translation Example

```
(Incoming) SIP: [Message no.1]
-----------------------------------------------------------
SUBSCRIBE sip:192.168.0.122:5060?room=1 SIP/2.0
Via: SIP/2.0/UDP 192.168.0.9:6050;branch=z9hG4bK44.d0a.285a
To: <sip:imsAS@ericsson.com?room=1>;tag=1702530372
From: <sip:bob@ericsson.com>;tag=cd057c-9e2.3d3e
Call-ID: 1fd7-1ace-7c957b8@192.168.0.9
CSeq: 2532 SUBSCRIBE
Max-Forwards: 70
User-Agent: snet
Route: <sip:orig@192.168.0.9:5060;lr>
Contact: <sip:bob@192.168.0.9:6050>;+g.snet.etk.ericsson.com
Content-Length: 0
Accept: text/plain
Expires: 1
Event: sensor
-----------------------------------------------------------
(Outgoing) SOAP: [Message no.2]
-----------------------------------------------------------
POST /WS/Service.asmx HTTP/1.1
Host: 192.168.0.2
Content-Type: application/soap+xml; charset=utf-8
Content-Length: 335
<?xml version="1.0" encoding="utf-8" ?>
<soap12:Envelope xmlns:xsi="http://www.w3.org/2001/
XMLSchema-instance"
xmlns:xsd="http://www.w3.org/2001/XMLSchema"
xmlns:soap12="http://www.w3.org/2003/05/soap-envelope">
<soap12:Body>
<getSensorData xmlns="http://tempuri.org/">
<room>1</room>
</getSensorData>
</soap12:Body>
</soap12:Envelope>
-----------------------------------------------------------
```

SOAP→SIP Translation Example

```
(Incoming) SOAP: [Message no.3]
-----------------------------------------------------------
HTTP/1.1 200 OK
Date: Fri, 21 Sep 2007 09:29:11 GMT
Server: Microsoft-IIS/6.0
X-Powered-By: ASP.NET
X-AspNet-Version: 2.0.50727
Cache-Control: private, max-age=0
Content-Type: application/soap+xml; charset=utf-8
Content-Length: 654
<?xml version="1.0" encoding="utf-8"?><soap:Envelope
xmlns:soap="http://www.w3.org/2003/05/soap-envelope"
xmlns:xsi="http://www.w3.org/2001/XMLSchema-instance"
xmlns:xsd="http://www.w3.org/2001/XMLSchema">
<soap:Body>
<getSensorDataResponse xmlns="http://tempuri.org/">
    <getSensorDataResult><?xml version="1.0"
    encoding="utf-8" ?>
    <sensor_values room="1"
    action="info"><bat down="2.7" up="3.3"
    >0.7</bat><tem down="-20" up="99.99"
    >25</tem><lig down="0" up="1023"
    >1542.62501631986</lig><mic>350</mic>
    </sensor_values>
    </getSensorDataResult>
</getSensorDataResponse>
</soap:Body>
</soap:Envelope>
-----------------------------------------------------------
(Outgoing) SIP: [Message no.4]
-----------------------------------------------------------
NOTIFY sip:bob@192.168.0.9:6050 SIP/2.0
To: <sip:bob@ericsson.com>;tag=cd057c-9e2.3d3e
From: <sip:imsAS@ericsson.com?room=1>;tag=1702530372
Contact: <sip:192.168.0.122:5060>
Call-ID: 1fd7-1ace-7c957b8@192.168.0.9
Max-Forwards: 70
Content-Length: 226
Via: SIP/2.0/UDP 192.168.0.9:6050;branch=z9hG4bK42.789c.3d3e
Event: sensor
subscription-state: Active
Content-Type: text/plain
CSeq: 1 NOTIFY
Expires: 1
<?xml version="1.0" encoding="utf-8" ?>
<sensor_values room="1" action="info">
    <bat down="2.7" up="3.3" >0.7</bat>
    <tem down="-20" up="99.99" >25</tem>
    <lig down="0" up="1023" >1542.62501631986</lig>
    <mic>350</mic>
</sensor_values>
-----------------------------------------------------------
```

Figure 7:
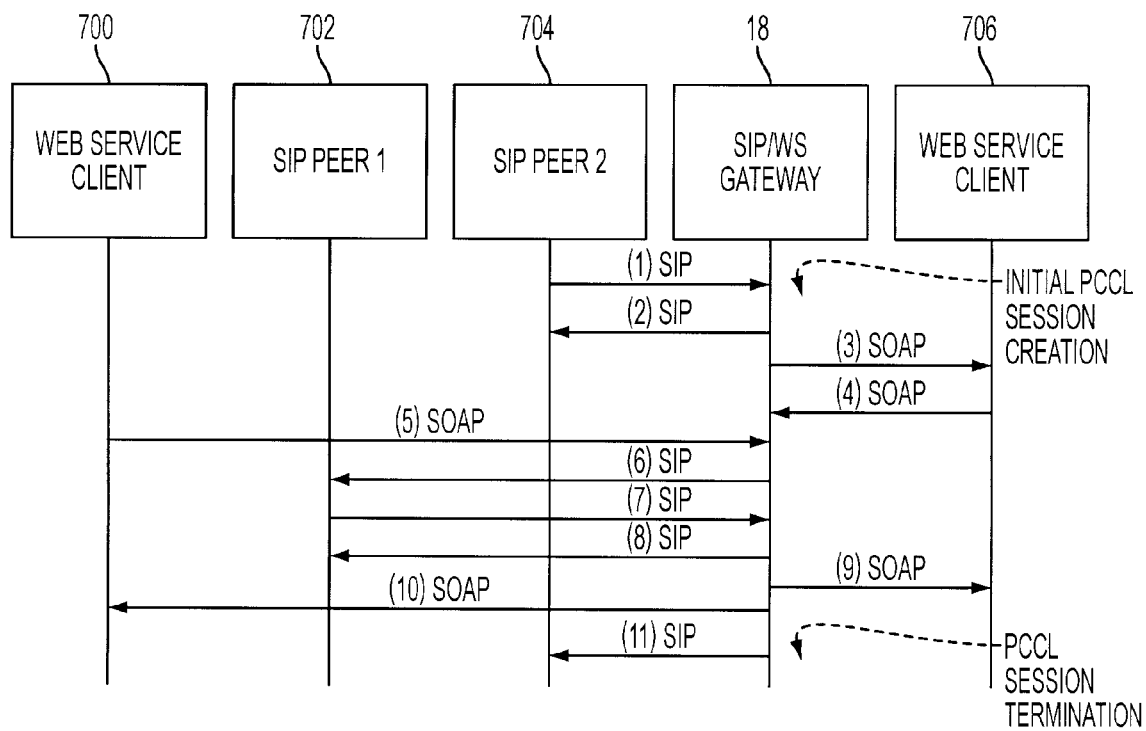
FIG. 7 shows message conversion between a plurality of peer devices according to another exemplary embodiment.

The exemplary embodiment described above with respect to FIG. 6 depicts a bilateral exchange of four converted messages between two client devices via a gateway 18. However, it will be appreciated by those skilled in the art that the present invention is not limited thereto. In fact, exemplary embodiments are capable of receiving, session-binding, converting and transmitting any number messages between any number of peer or client devices. After reception of an initial message, the order and number of incoming and outgoing messages associated with a particular session is unlimited, as long as they conform to conversion and coordination rules of a PCCL application 214. For instance, in the exemplary embodiment illustrated in FIG. 7, a single PCCL application 214 can specify an exchange pattern that will, in one PCCL session, bind eleven messages (e.g., SIP/SOAP, incoming/outgoing, requests/responses) associated with four different peers 700, 702, 704 and 706. FIG. 7 also demonstrates an exemplary exchange pattern of the messages (i.e., the order in which the messages should be exchanged).

Thus, exemplary embodiments as described above provide for software, methods, systems and devices which provide for, among other things, a formal specification of coordination and conversion rules (embodied in a PCCL language). This set of rules enable some or all of the following functions: (1) specifying the peers that are coordinated with the PCCL application 214, (2) specifying interfaces of the peers which are coordinated, (3) specifying rules that enable correlation of received messages to existing binding sessions (PCCL sessions 300), (4) specifying rules that create new PCCL sessions 300, (5) specifying condition matching rules which determine the actions which should be taken when a particular condition is met, (6) specifying the actions that need to be taken including, for example, storing and retrieving session information from a session repository, creating specific SIP and SOAP messages and terminating specific PCCL (binding) sessions, (7) specifying queries for getting information from incoming SIP or SOAP messages and storing that information into a session repository (such queries can, for example, be made with, e.g., regular expressions or X-Path pointer, and (8) specifying queries for obtaining information from a session repository and putting that information into outgoing SIP or SOAP messages (such queries can be made with, e.g., regular expressions or X-Path pointer). Additionally, such software, methods, systems and devices provide some or all of the following features in a conversion mechanism: (1) the ability to run multiple applications simultaneously, (2) an application repository that stores multiple applications that are currently executing, and (3) the ability to deploy new applications (e.g., by way of new PCCL specifications of coordination and conversion rules) during the execution of the system (thus no need for shutdown).

Additionally, these exemplary embodiments provide for binding sessions (e.g., embodied in PCCL sessions 300) associated with the conversion of sequences of messages. The binding session is the session of the PCCL application 214 that runs on the SIP/WS gateway (integration system 18). This includes the capability to start such a binding session upon reception of either SIP or SOAP message, as well as the capability to bind several SIP and/or SOAP sessions within one binding session. The dynamic aspect of such exemplary embodiments can be seen in, for example, the ability to specify rules that state how these binding sessions are created, e.g., as shown in the flowchart of FIG. 3.

According to one exemplary embodiment, an integration system 18 includes five modules that use external rules which govern their operation. A message receiver 216 uses specification of peers in order to be able to implement the messaging interfaces (e.g., SIP and SOAP) that are required by the system to handle incoming messages. A session correlator 220 uses session correlation rules to map the incoming messages to a session and to create new sessions. A condition matcher 222 uses matching rules and current session information to determine the set of actions that need to be performed to convert a particular incoming message into a particular outgoing message. An action executor 224 uses an action specification to create outgoing messages and/or store session information into the session repository 226. Finally, the message sender 218 sends messages to outgoing peers.

Figure 8:
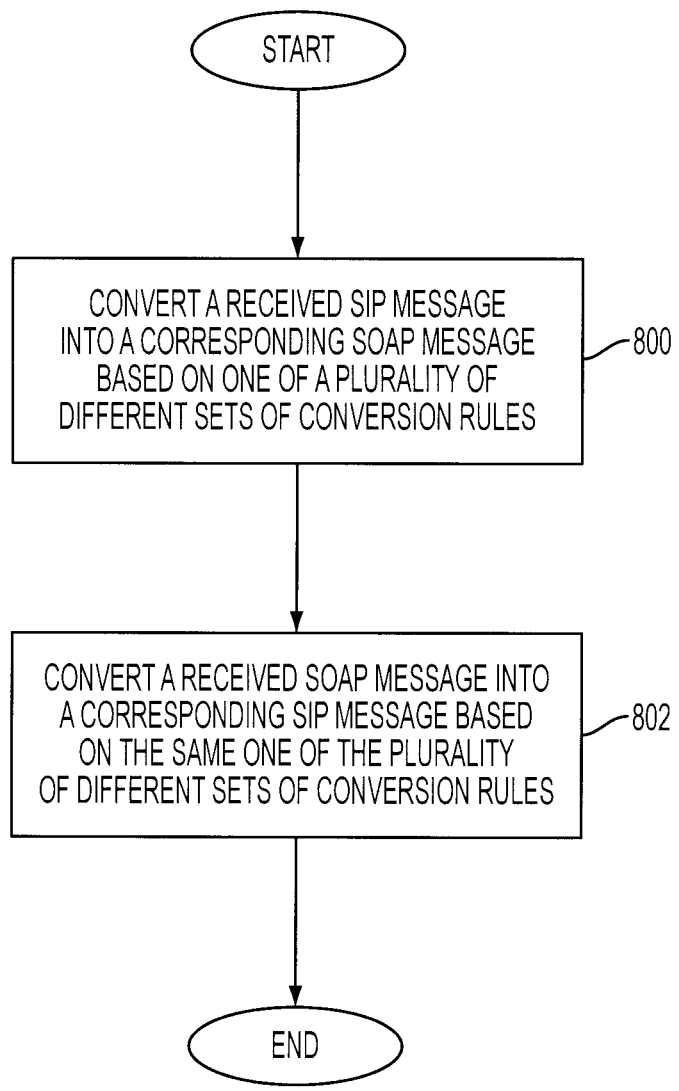
FIG. 8 is a flow chart illustrating a method for message conversion according to an exemplary embodiment.

According to another exemplary embodiment, as illustrated in the flow chart of FIG. 8, a method for converting messages, which can be performed by way of software being executed on a processor or computer, includes the steps of converting a received Session Initiation Protocol (SIP) message into a corresponding Simple Object Access Protocol (SOAP) message based on one of a plurality of different sets of conversion rules (step 800), and converting a received SOAP message into a corresponding SIP message based on the same one of the plurality of different sets of conversion rules (step 802).

The afore-described, and other, exemplary systems and methods for communicating can be implemented by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above to send or receive SIP/SOAP messages. In alternative embodiments, hard-wire circuitry may be used in place of or in combination with software instructions to implement these exemplary embodiments.

The above-described exemplary embodiments are intended to be illustrative in all respects, rather than restrictive, of the present invention. Thus the present invention is capable of many variations in detailed implementation that can be derived from the description contained herein by a person skilled in the art. For example, the syntax of the PCCL language described above can be varied and different syntax could be used in different embodiments. Additionally, a compiler is not required. Instead other embodiments of the system could execute without a compiler, e.g., directly obtaining the definitions from the language. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A system for converting an incoming message of a first message type into an outgoing message of a second message type comprising:
    a repository for containing a plurality of Protocol Conversion and Coordination Language (PCCL) specifications comprising:
        a specification of peers;
        a set of session correlation rules;
        a set of matching rules; and
        an action specification;
    a PCCL application compiled from a PCCL specification selected from the plurality of PCCL specifications;
    a message receiver processor, which uses the set of specification of peers in a first domain, to identify one or more peers communicating via an incoming message of a first type;
    a session correlator, which applies the set of session correlation rules to the identified peers and information extracted from content of the incoming message to map the incoming message to a PCCL session among a plurality of PCCL sessions if an appropriate PCCL session is already active or to a newly created PCCL session if an appropriate PCCL session does not exist;
    a condition matcher, which uses the set of matching rules and session data of the PCCL session to which the incoming message is mapped, to determine a set of actions to be performed to convert the incoming message into an outgoing message of a second type;
    an action executor which uses the action specification to execute the set of actions; and
    a message sender processor which sends said outgoing message to one or more peers in a second domain.

2. The system of claim 1, wherein said system converts incoming Session Initiation Protocol (SIP) messages into outgoing Simple Object Access Protocol (SOAP) messages and converts incoming SOAP messages into outgoing SIP messages.

3. The system of claim 1, further comprising:
a session repository for storing the plurality of message conversion sessions, each session being associated with a set of peers, a set of conversion rules and at least one incoming message.

4. The system of claim 3, wherein said set of peers has an arbitrary number of peers associated therewith and said at least one incoming message is an arbitrary number of messages.

5. The system of claim 1, wherein the first protocol is a stateful protocol and the second protocol is a stateless protocol.

6. A method for transmitting messages between protocols comprising:
storing a plurality of Protocol Conversion and Coordination Language (PCCL) specifications in a repository, each PCCL specification comprising:
a specification of peers;
a set of session correlation rules;
a set of matching rules; and
an action specification;
compiling a PCCL application from a PCCL specification selected from the plurality of PCCL specifications;
receiving an incoming first message of a first protocol to identify one or more peers using the set of specification of peers in a first domain;
applying the set of session correlation rules to the identified one or more peers and information extracted from content of the incoming message to map the incoming message to a PCCL session among a plurality of PCCL sessions if an appropriate PCCL session is already active or to a newly created PCCL session if an appropriate PCCL session does not exist and using the set of matching rules and session data of the PCCL session to which the incoming message is mapped, to determine a set of actions to be performed to convert the incoming message into an outgoing message of a second type;
converting said incoming first message to an outgoing first message which uses a second protocol that is different than said first protocol using said set of matching rules and action specification;
transmitting said outgoing first message to one or more peers in a second domain;
receiving an incoming second message which uses said second protocol in response to said first incoming message;
correlating said incoming second message to said PCCL session;
converting said incoming second message to an outgoing second message which uses said first protocol using said set of matching rules and action specification; and
transmitting said outgoing second message to the one or more peers in the first domain.

7. The method of claim 6, where said first protocol is Session Initiation Protocol (SIP) and wherein said second protocol is Simple Object Access Protocol (SOAP) messages.

8. The method of claim 6, wherein said first four steps of receiving, correlating, converting and transmitting are performed a plurality of times during said session.

9. The method of claim 6, wherein said second four steps of receiving, correlating, converting and transmitting are performed a plurality of times during said session.

10. The method of claim 6, wherein the first protocol is a stateful protocol and the second protocol is a stateless protocol.

11. A non-transitory computer-readable medium storing instructions which, when executed on a processor, perform the steps of:
storing a plurality of Protocol Conversion and Coordination Language (PCCL) specifications in a repository, each PCCL specification comprising:
a specification of peers;
a set of session correlation rules;
a set of matching rules; and
an action specification;
compiling a PCCL application from a PCCL specification selected from the plurality of PCCL specifications;
receiving an incoming Session Initiation Protocol (SIP) message to identify one or more peers using the set of specification of peers in a first domain;
applying the set of session correlation rules to the identified one or more peers and information extracted from content of the incoming message to map the incoming SIP message to a PCCL session among a plurality of PCCL sessions if an appropriate PCCL session is already active or to a newly created PCCL session if an appropriate PCCL session does not exist and using the set of matching rules and session data of the PCCL session to which the incoming SIP message is mapped, to determine a set of actions to be performed to convert the incoming SIP message into an outgoing Simple Object Access Protocol (SOAP) message;
converting said incoming SIP message to an outgoing SOAP message using said set of matching rules and action specification;
transmitting said outgoing SOAP message to one or more peers in a second domain;
converting a received SOAP message related to the outgoing SOAP message into a corresponding SIP message based on said set of matching rules and action specification.

12. The computer-readable medium of claim 11, further comprising the step of:
storing said session data of the communication session to which said received SIP message and said received SOAP message pertain.

13. The computer-readable medium of claim 11, wherein said plurality of different sets of conversion rules are dynamically adaptable.

14. The computer-readable medium of claim 11, wherein the first protocol is a stateful protocol and the second protocol is a stateless protocol.

* * * * *

UNITED STATES PATENT AND TRADEMARK OFFICE
CERTIFICATE OF CORRECTION

PATENT NO. : 8,850,069 B2
APPLICATION NO. : 12/103801
DATED : September 30, 2014
INVENTOR(S) : Benc et al.

Page 1 of 1

It is certified that error appears in the above-identified patent and that said Letters Patent is hereby corrected as shown below:

In the Specification

In Column 1, Line 38, delete "WDSL" and insert -- WSDL --, therefor.

In Column 9, Line 53, delete "PCCL specification 214." and insert -- PCCL specification 200. --, therefor.

In Column 10, Line 17, delete "PCCL specification 214." and insert -- PCCL specification 200. --, therefor.

In Column 12, Line 34, delete "wsl" and insert -- ws1 --, therefor.

In the Claims

In Column 22, Line 1, in Claim 7, delete "where" and insert -- wherein --, therefor.

Signed and Sealed this
Fifth Day of May, 2015

Michelle K. Lee
*Director of the United States Patent and Trademark Office*